Sept. 15, 1953
T. G. WALKER
2,652,229
WAGON HOIST
Filed June 21, 1949
3 Sheets-Sheet 1
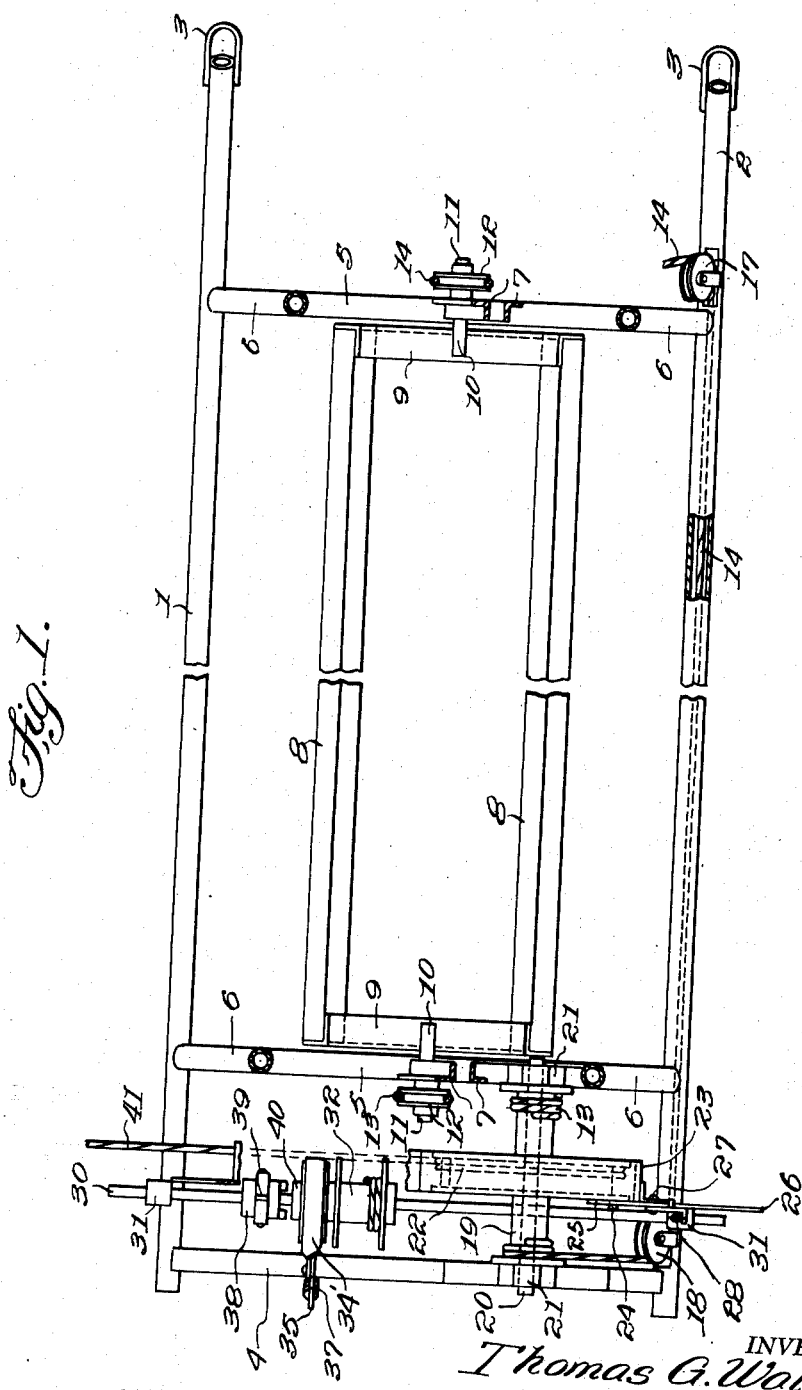
INVENTOR.
Thomas G. Walker,
BY Victor J. Evans & Co.
ATTORNEYS Sept. 15, 1953

T. G. WALKER 2,652,229

WAGON HOIST

Filed June 21, 1949

INVENTOR.
Thomas G. Walker,
BY Victor J. Evans & Co.
ATTORNEYS

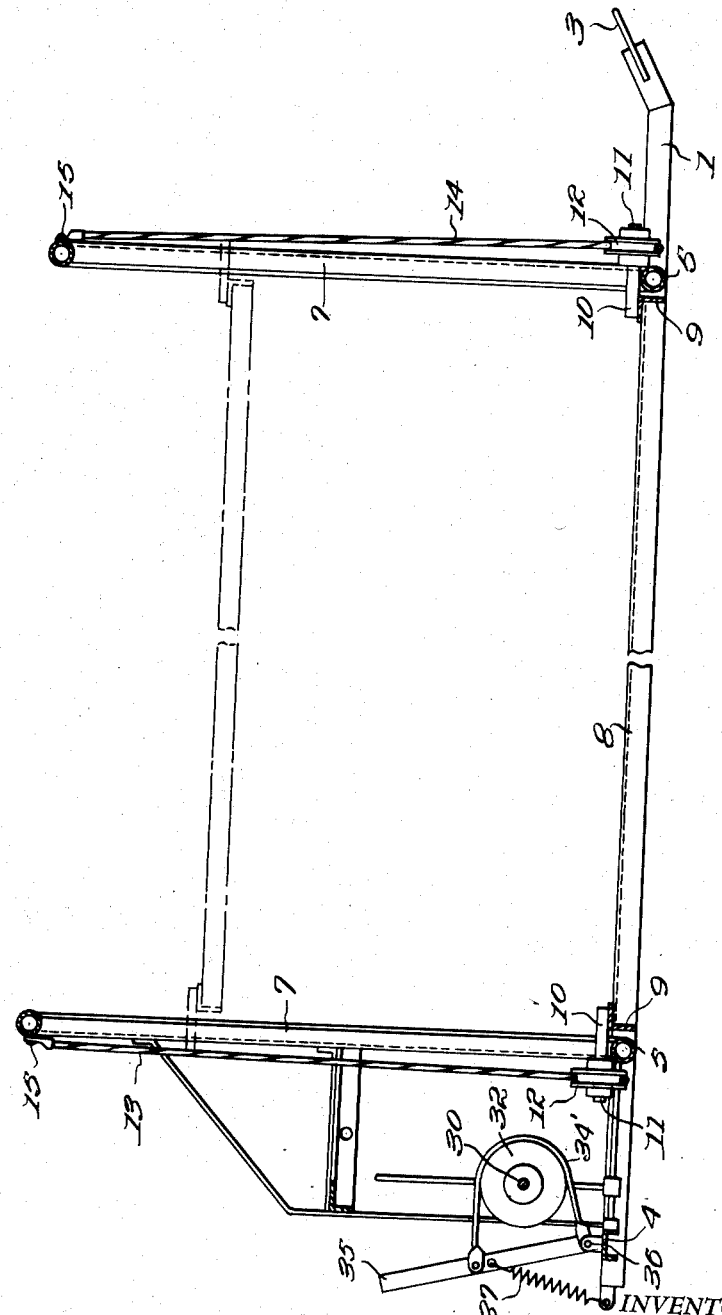

Patented Sept. 15, 1953

2,652,229

UNITED STATES PATENT OFFICE 2,652,229

WAGON HOIST

Thomas G. Walker, Nishnabotna, Mo.

Application June 21, 1949, Serial No. 100,426

2 Claims. (Cl. 254—47)

The present invention relates to the general class of portable elevators or hoisting mechanism of the cable and drum type, and more specifically to an improved wagon hoist or elevator, which while well adapted for use in barns and other places for storing grains and other materials or articles, is especially designed for field use in up-ending or tilting a four-wheel vehicle, as a grain wagon or truck, by raising or elevating the front end and front wheels of the vehicle from the ground. For this purpose the wagon is rolled into the frame of the hoisting mechanism to position the front wheels upon an elevator or rack while the rack is in lowered position, and then with power take off mechanism the rack is lifted to elevate and support the front wheels with the body or box of the wagon in tilted position and the major portion of the load supported by the rear wheels which remain on the ground.

With the wagon in uplifted position its load may be discharged by gravity to a conveyor or other power operated appliance that unloads the wagon or truck; and after the unloading operation the empty wagon is driven out of the hoisting frame.

The portable hoisting mechanism of my invention includes a minimum number of parts that may with facility be manufactured at comparatively low cost of production, and the parts may be assembled with convenience to assure a wagon hoist that is simple in construction and operation, durable, and efficient in the performance of its functions.

The invention consists in certain novel features of construction and combinations and arrangements of parts as will hereinafter be described and more particularly pointed out in the appended claims.

In the accompanying drawings I have illustrated a complete example of a physical embodiment of my invention in which the parts are combined and arranged in accord with one mode I have devised for the practical application of the principles of the invention. It will however be understood that changes and alterations are contemplated and may be made in these exemplifying drawings and mechanical structures, within the scope of my claims without departing from the principles of the invention.

Figure 1 is a top plan view of the wagon hoist of my invention, shown as a horizontal section on line 1—1 of Fig. 2.

Figure 4 is a longitudinal vertical sectional view of the appliance, with parts omitted.

Figures 2, 3:
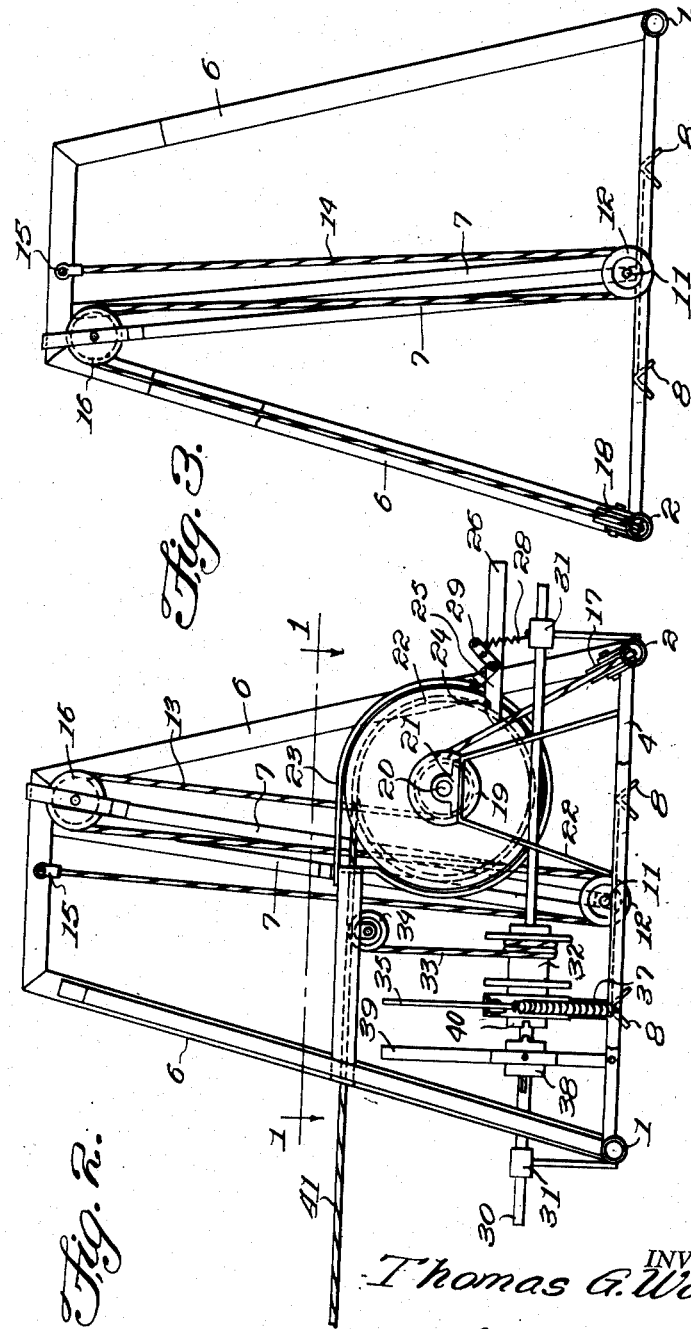
Figures 2 and 3 are views in elevation at the opposite ends of the hoisting appliance.

In carrying out my invention I employ a rectangular base frame that includes a pair of laterally spaced tubular or cylindrical sills 1 and 2, each equipped with a hitching clevis 3 for attachment to a suitable towing vehicle, when the wagon hoist is to be transported, and the sills perform the functions of runners in gliding over the ground surface.

The sills are united by a transverse channel beam 4 near one end of the appliance, and tubular cross bars 5, 5 to provide a rigid and strong base for two spaced A-shaped supports 6, 6, also of tubular construction, and which form the elevator or hoist frame. This elevator frame also includes a pair of rigidly mounted and spaced upright guide rails 7, 7, for the horizontal and rectangular rack or elevator upon which the front wheels of the wagon or truck are to be supported as the wagon is being lifted, supported, and lowered, with the rear wheels as a ground support.

The elevator or rack includes a pair of longitudinally extending inverted angle beams 8, 8, the flanges of which provide a rest or retaining seat for the two front wheels of the truck or wagon, and these side beams are united by end angle iron beams or bars 9, 9, to provide a rigid carrier or rack for supporting the wheels and the front portion of the truck. These end bars are each equipped with a slide or guide stud 10, and the studs are positioned between and have sliding contact with the two slightly inclined guide rails 7, 7; and each end is also equipped with a centrally arranged trunnion or shaft 11 upon which an externally grooved wheel 12 is journaled.

Two elevator cables 13 and 14, each anchored at one end 15 to the top cross bar of an upright frame 6, are looped under the wheels 12, 12 of the rack, and from these wheels the cables extend upwardly over and around guide sheaves 16, 16, journaled in bearings at the top of the elevator frame.

From its upper guide sheave the cable 14 extends downwardly to and around a lower guide sheave 17 journaled in bearings mounted upon the tubular sill 2, and then this cable enters through a hole into the sill and extends through the tubular sill and out through another hole in the sill and around a second bottom sheave 18, up to a power windlass 19 where it is anchored for winding and unwinding. The cable 13 extends downwardly from its upper guide sheave 16 to the windlass 19 where it is anchored for coaction with the cable 14 in elevating and lowering the rack.

The windlass 19 is mounted upon a shaft 20 journaled in bearings 21 of the windlass frame, and the rotary movement of the shaft and windlass are controlled by means of a rotary cable drum 22 rigid with the shaft and windlass, and mounted within a fixed housing 23.

For retaining the cable power drum against undesired unwinding movement, it is equipped with a stop pin or lug 24 that coacts with a snap hook 25 formed integral with an off-center detent 26 pivoted at 27 on a bracket rigid with the housing. By manually shifting the detent it is snapped by spring 28 and lever arm 29 across the center of pivot 27 to engage the stop lug, and by a reverse movement, the lug is released to permit rotary movement of the power drum.

The windlass and its control drum are operated by means of a power shaft 30 taking off power from a tractor or other suitable power plant, and the shaft, which is journaled in bearings 31 supported on the base frame, is equipped with a loosely journaled, flanged reel 32 to one end of which a cable 33 is attached, and this cable extends around a guide sheave 34 to the control drum 22 to which its other end is attached.

For retaining or braking the rotary movement of the reel, a U-shaped brake-shoe 34' is attached at one end to a brake lever 35, with its other end attached to the pivotal mount 36 of the lever, and a spring 37, anchored to the lever and fixed to a portion of the frame or base of the hoisting mechanism, resiliently holds the brake shoe in contact with the reel.

For operatively connecting the reel for rotary movement with the shaft, a longitudinally shiftable clutch member 38 is mounted on the shaft and manually operated by the clutch lever 39 for engagement with the complementary clutch member 40 of the reel.

The control drum 22 is also provided with an auxiliary cable 41 that may be attached to a tractor or the like or pulled by hand, or any suitable means, and by drawing on the cable 41 the drum 22 may be actuated to elevate the rack and front end of a wagon.

Having thus fully described by invention what I claim as new and desire to secure by Letters Patent is:

1. In a hoist, a base frame including a pair of spaced parallel tubular sills, a hitching clevis connected to each of said sills, a channel beam extending between said pair of sills and secured thereto, a pair of spaced parallel crossbars extending between said sills and secured thereto, a support member extending upwardly from each of said crossbars and secured thereto, a pair of spaced guide rails mounted in each of said support members, a rack for supporting the wheels of a vehicle including a pair of spaced parallel beams, bars extending between said last named beams and secured thereto, a stud secured to each end of the rack and slidably engaging said guide rails, a grooved wheel connected to each of said studs, a first and second cable connected to said support members and trained under said pulleys, upper guide sheaves journaled at the top of the support members and having the cables trained thereon, a lower guide sheave journaled on one of said sills, a windlass having said first cable arranged in engagement therewith, said second cable engaging said lower guide sheave and extending through one of said sills and engaging said windlass, a rotary cable drum adapted to be connected to a power source for rotating said windlass.

2. The apparatus as described in claim 1, and further including a stop pin connected to said drum, and a snap hook provided with an off center detent for engaging said stop pin.

THOMAS G. WALKER.

References Cited in the file of this patent

UNITED STATES PATENTS

| Number | Name | Date |
|---|---|---|
| 1,355,690 | Rasmussen | Oct. 12, 1920 |
| 1,546,492 | Kelley | July 21, 1925 |
| 1,806,433 | Weaver et al. | May 19, 1931 |
| 2,349,911 | Neighbour et al. | May 30, 1944 |
| 2,466,688 | Culver | Apr. 12, 1949 |
| 2,483,775 | Klaris | Oct. 4, 1949 |